United States Patent
Kawashima et al.

(10) Patent No.: US 9,321,384 B2
(45) Date of Patent: Apr. 26, 2016

(54) CUP HOLDER

(71) Applicant: TS TECH CO., LTD., Asaka-shi, Saitama (JP)

(72) Inventors: Yuji Kawashima, Shioya-gun (JP); Takeshi Sato, Shioya-gun (JP); Hideki Usami, Shioya-gun (JP); Hiroshi Izawa, Shioya-gun (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/416,673

(22) PCT Filed: Jul. 26, 2013

(86) PCT No.: PCT/JP2013/070314
§ 371 (c)(1),
(2) Date: Jan. 23, 2015

(87) PCT Pub. No.: WO2014/017628
PCT Pub. Date: Jan. 30, 2014

(65) Prior Publication Data
US 2015/0203016 A1    Jul. 23, 2015

(30) Foreign Application Priority Data
Jul. 27, 2012  (JP) ................. 2012-167479

(51) Int. Cl.
| A47K 1/08 | (2006.01) |
| B60N 3/10 | (2006.01) |
| B60N 2/46 | (2006.01) |
| B65D 43/22 | (2006.01) |
| F16B 5/06 | (2006.01) |

(52) U.S. Cl.
CPC ................ *B60N 3/10* (2013.01); *B60N 2/4613* (2013.01); *B60N 3/101* (2013.01); *B60N 3/102* (2013.01); *B65D 43/22* (2013.01); *F16B 5/0657* (2013.01); *B65D 2543/00231* (2013.01); *F16B 5/065* (2013.01); *F16B 5/0664* (2013.01)

(58) Field of Classification Search
CPC .......... B60N 3/10; B60N 3/106; B60N 3/103; B65D 2543/00231
USPC ..................... 248/311.2; 224/148.1; 206/427; 220/737
See application file for complete search history.

(56) References Cited

U.S. PATENT DOCUMENTS

| 2012/0074188 A1* | 3/2012 | Andersson ........... B60N 2/4613 224/539 |
| 2014/0124638 A1* | 5/2014 | Takai .................... B60N 3/106 248/311.2 |

FOREIGN PATENT DOCUMENTS

| JP | 05-017211 U | 3/1993 |
| JP | 2010-149799 A | 7/2010 |

* cited by examiner

*Primary Examiner* — Todd M Epps
(74) *Attorney, Agent, or Firm* — Carrier Blackman & Associates, P.C.; Joseph P. Carrier; William D. Blackman

(57) ABSTRACT

A cup holder comprises a lid body in which an upper lid and a lower lid are connected by an engagement mechanism. The engagement mechanism includes: a claw part that protrudes from the upper lid; an arch part that protrudes from the lower lid and engages with the claw part; and a protrusion wall that is provided contiguously to the upper lid or the lower lid and restricts the arch part from collapsing in a state where the claw part and the arch part are engaged.

10 Claims, 5 Drawing Sheets

CUP HOLDER

TECHNICAL FIELD

The present invention relates to a cup holder equipped with a lid body that is capable of opening and closing.

BACKGROUND ART

In a vehicle such as an automobile or the like, a cup holder is provided for accommodating and holding drink containers that are brought into the vehicle by passengers. This type of cup holder includes a structure in which the cup holder is closed by a lid body so that an interior (accommodating space) thereof cannot be seen when the cup holder is not in use, and when in use, the lid body is opened to expose the interior (see Japanese Laid-Open Patent Publication No. 2010-149799).

The cup holder of Japanese Laid-Open Patent Publication No. 2010-149799 comprises an accommodating member for accommodating a cup, and a lid body, which is mounted rotatably on one side of the accommodating member. The lid body is constituted from two lid members (a front side member and a rear side member), wherein the front side member and the rear side member are integrally formed by fitting peripheral edge portions thereof to each other.

SUMMARY OF INVENTION

Incidentally, if the lid body is made up from a plurality of lid members (a front side member and a rear side member) as in the cup holder disclosed in Japanese Laid-Open Patent Publication No. 2010-149799, if adhesive bonding or welding, etc., is carried out in order to fit and connect the lid members to each other, the production cost and number of manufacturing steps are increased. For this reason, it is desirable for the lid body to be provided with an engagement mechanism, which serves to connect the plural lid members, and for an engaging member and an engaged member possessed by the engagement mechanism to be engaged with each other. However, with this type of engagement mechanism, vibrations from the vehicle or shocks that occur upon opening and closing the lid body are conveyed, which impose stresses (external forces) on the engaging and engaged members. As a result, deformation of the engaging and engaged members or loosening of the engagement sites occurs, leading to rattling or play in the engagement mechanism, or in certain situations, the lid members may become disengaged from one another.

The present invention has been devised with the aforementioned problems in mind, and has the object of providing a cup holder in which, in a lid body constituted from a plurality of lid members, the lid members can be connected more reliably by means of a simple structure, and loosening or separation of the lid members from one another can be prevented.

For achieving the aforementioned objects, the present invention is a cup holder having a lid body in which plural lid members are connected by an engagement mechanism, the lid body being capable of opening and closing. In particular, the cup holder includes the following features:

First Feature: The engagement mechanism includes an engaging member that projects from one of the lid members from among the plural lid members, an engaged member that projects from another of the lid members from among the plural lid members, and which is engaged by the engaging member, and a regulating member disposed on either one of the plural lid members, which prevents falling over of the engaging member or the engaged member under a condition in which the engaging member and the engaged member are engaged.

Second Feature: The engaged member is an arch-shaped piece having a hole or a recess formed therein, the engaging member includes a hook-shaped part capable of being latched onto the arch-shaped piece, and the regulating member includes a projecting wall, which is disposed at a facing position separated a predetermined distance from the hook-shaped part, and in cooperation with the hook-shaped part, grips the arch-shaped piece under a condition in which the arch-shaped piece and the hook-shaped part are engaged.

Third Feature: The projecting wall includes a guide member, which is capable of guiding the arch-shaped piece between the projecting wall and the hook-shaped part.

Fourth Feature: The projecting wall extends a predetermined length in a direction perpendicular to a widthwise direction of the hook-shaped part, and a width of the projecting wall that faces the hook-shaped part is narrower than a width of the arch-shaped piece.

Fifth Feature: The width of the projecting wall that faces the hook-shaped part is narrower than a width of the hook-shaped part.

Sixth Feature: The regulating member is arranged together with an upper part of the arch-shaped piece between the hook-shaped part and the projecting wall under a condition in which the arch-shaped piece and the hook-shaped part are engaged, and includes an abutting portion, which is gripped together with the arch-shaped piece, by a predetermined abutting force by the projecting wall and the hook-shaped part.

Seventh Feature: The regulating member includes a support wall, which is disposed together with the arch-shaped piece on the other lid member, and supports the arch-shaped piece in a projecting state, support wall reinforcing members configured to reinforce the projecting state of the support wall are disposed on both ends in a widthwise direction of the support wall, and the projecting wall is positioned between the support wall reinforcing members under a condition in which the arch-shaped piece and the hook-shaped part are engaged.

According to the first feature of the present invention, the lid body includes the regulating member for preventing falling over of one of the engaging member and the engaged member, whereby the engaging force between the engaging member and the engaged member can significantly be enhanced. More specifically, by a simple structure of the regulating member, since falling over of the engaging member or the engaged member is prevented and such members are engaged with each other, the plural lid members can be connected firmly to each other. Thus, for example, even if external stresses are applied to the lid body of the cup holder, deformation of the engaging member or the engaged member, or loosening of the engagement sites, etc., can be suppressed. Consequently, loosening and separation of the lid members from one another can suitably be prevented.

According to the second feature of the present invention, in a state of engagement between the arch-shaped piece and the hook-shaped part, the regulating member of the cup holder includes the projecting wall that grips the arch-shaped piece in cooperation with the hook-shaped part, whereby the arch-shaped piece can be connected without play. Further, by means of the projecting wall, since falling over of the arch-shaped piece on which the hook-shaped part is latched is prevented, in the cup holder, the state of engagement between the hook-shaped part and the arch-shaped piece can be maintained more reliably.

According to the third feature of the present invention, the projecting wall of the cup holder includes the guide member that is capable of guiding the arch-shaped piece. Thus, when the hook-shaped part is latched onto the arch-shaped piece, if the arch-shaped piece comes into abutment against the guide member, the arch-shaped piece is smoothly guided and the hook-shaped part can be hooked over the arch-shaped piece.

According to the fourth feature of the present invention, the projecting wall of the cup holder extends a predetermined length in a direction perpendicular to the widthwise direction of the hook-shaped part, so that even if the projecting wall is formed to be small in size, stresses applied to the projecting wall from the arch-shaped piece with which the hook-shaped part is engaged can suitably be received.

According to the fifth feature of the present invention, in the cup holder, by having the width of the projecting wall that faces the hook-shaped part to be narrower than the width of the hook-shaped part, the projecting wall can be made smaller, and thus an increase in the size of the lid body can be suppressed.

According to the sixth feature of the present invention, the cup holder includes the abutting portion, which is gripped together with the arch-shaped piece by a predetermined abutting force, by the projecting wall and the hook-shaped part. Thus, in a state of engagement between the arch-shaped piece and the hook-shaped part, gaps between the hook-shaped part and the projecting wall can be eliminated. Consequently, loosening and separation of the lid members from one another can suitably be prevented.

According to the seventh feature of the present invention, the support wall of the cup holder is disposed together with the arch-shaped piece on the other lid member, and supports the arch-shaped piece in a projecting state, whereby the strength of the arch-shaped piece can be enhanced significantly, and the engaged state of the arch-shaped piece and the hook-shaped part can be further strengthened and reinforced. Further, under a gripped condition of the arch-shaped piece and the support wall by the hook-shaped part and the projecting wall, the projecting wall can be inserted between the support wall reinforcing members. Therefore, without increasing the size of the engagement mechanism, an engaged state in which loosening or separation of the lid members is suppressed can be realized.

DESCRIPTION OF EMBODIMENTS

A preferred embodiment of a cup holder according to the present invention will be described in detail below with reference to the accompanying drawings.

Figure 1:
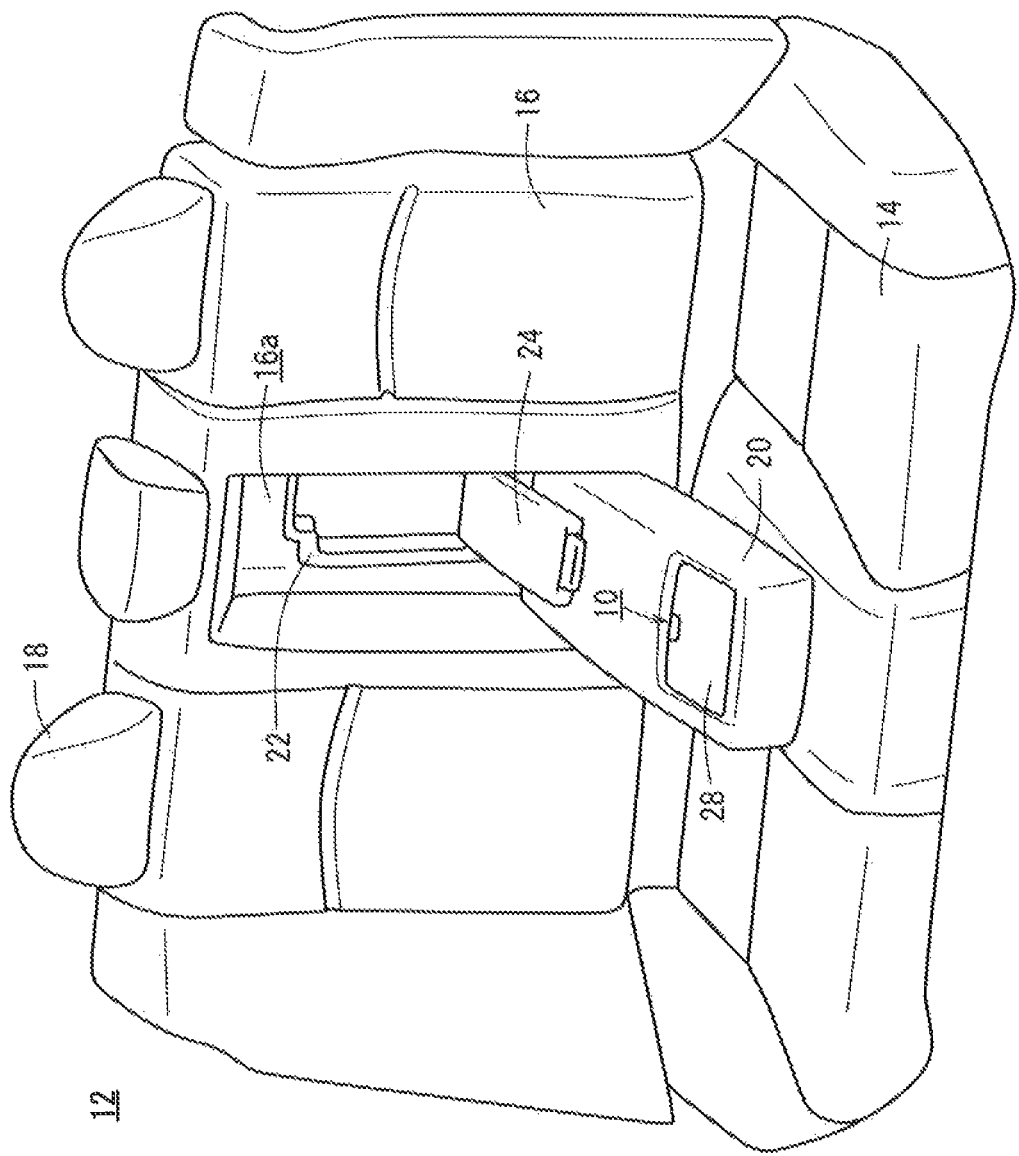
FIG. 1 is a schematic perspective view of a rear seat in which a cup holder according to the present invention is provided.

As shown in FIG. 1, a cup holder 10 according to an embodiment of the present invention is disposed in a rear seat 12 (seat device) of an automobile on which three people may be seated. The rear seat 12 comprises a seat cushion 14 that is mounted in a non-illustrated vehicle for seating of the vehicle occupants, a seat back 16 for supporting the backs of the seated occupants, and three headrests 18, which are vertically adjustable on an upper end of the seat back 16 and support the heads of the occupants.

The seat back 16 includes an armrest 20, which is capable of being accommodated in a rectangular hole 16a formed substantially in a center portion in the widthwise direction (seat width direction, lateral direction), a lid frame 22, which is arranged to cover the hole 16a from a back surface side, and in which an opening (trunk-through portion) is formed that enables communication between a vehicle compartment and a trunk room, and an openable/closable lid 24 mounted in the lid frame 22, which is capable of closing the opening.

The armrest 20 is disposed rotatably with respect to a back frame (not shown) that forms a skeleton of the seat back 16. Further, the cup holder 10 is provided on a distal end side of the armrest 20. The cup holder 10 includes an openable/closable lid body 28. The location where the cup holder 10 is installed is not particularly limited, and it goes without saying that the cup holder 10 may be disposed in any of various locations. For example, as potential installation locations, there may be considered a floor console between a driver's seat and a passenger seat, and an inner surface side of a door that is opened and closed by the vehicle occupants.

Figure 2:
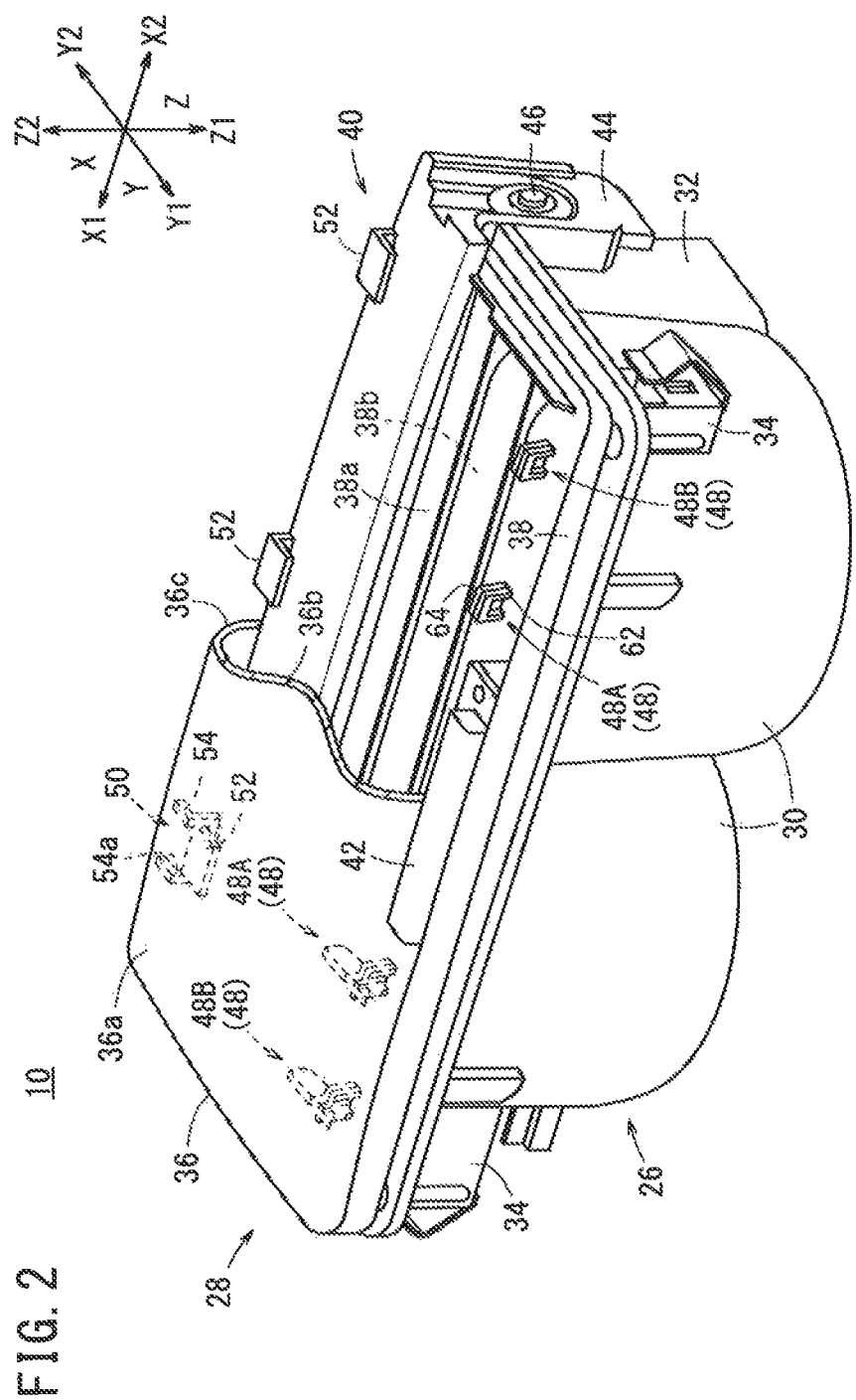
FIG. 2 is a perspective view with partial omission illustrating the structure of the cup holder of FIG. 1.

FIG. 2 is a perspective view with partial omission illustrating the structure of the cup holder 10 of FIG. 1. In the following descriptions, based on the directions of the arrows shown in FIG. 2, a longitudinal direction of the cup holder 10 is referred to as X-directions (a left side is indicated by the arrow X1, a right side is indicated by the arrow X2 in FIG. 2), the lateral (short-side) direction is referred to as Y-directions (a front side is indicated by the arrow Y1, a rear side is indicated by the arrow Y2 in FIG. 2), and a heightwise direction is referred to as Z-directions (a lower side is indicated by the arrow Z1, an upper side is indicated by the arrow Z2 in FIG. 2).

The cup holder 10 according to the present invention is capable of accommodating and holding two drink containers, is formed with a horizontally elongate shape overall, and is formed in a box-like shape having a predetermined depth. The cup holder 10 includes an accommodating member 26 that is inserted and fixed in the interior of the armrest 20, and the lid body 28 disposed for opening and closing on an upper portion of the accommodating member 26.

The accommodating member 26 of the cup holder 10 comprises a pair of container holding sections 30, which are formed in the shape of bottomed cylinders. The pair of container holding sections 30 includes accommodating spaces therein (not shown) in which drink containers can be accommodated. At adjacent positions in the Y2 direction of the container holding sections 30, bottomed rectangular prism shaped mechanism housings 32 are provided. Holding mechanisms (not shown), which apply a predetermined pressure to the containers arranged in the accommodating spaces for thereby holding the containers, are disposed in the mechanism housings 32.

Further, on both side surfaces in the X-directions of the pair of container holding sections 30, attachment members 34 are disposed for attaching the cup holder 10 to the armrest 20. Further, the lid body 28 is mounted rotatably on both side surfaces in the X-directions of the pair of mechanism housings 32.

The lid body 28 is formed in a substantially rectangular shape as viewed in plan, and covers an upper surface of the accommodating member 26. The lid body 28 is openable and closable on the side in the Y1 direction by being rotated about the side in the Y2 direction. Further, the lid body 28 is constructed integrally by stacking two lid members (an upper lid 36 and a lower lid 38). Between the upper lid 36 and the lower lid 38, an assembly structure 40 is provided for connecting both lid members.

In a state in which the accommodating member 26 is closed by the lid body 28, an upper surface 36a of the upper lid 36 is visible together integrally with the armrest 20. Therefore, the upper surface 36a of the upper lid 36 is formed by a design surface which produces no sense of incongruity with the armrest 20. Further, a peripheral edge 36c of the upper lid 36 projects downwardly at a predetermined length, so as to form a cavity in which the assembly structure 40 can be interposed between the upper lid 36 and the lower lid 38.

In the center of a side in the Y1 direction of the lid body 28, a guide member 42 is provided, which enables the occupant to recognize the opening and closing position of the cup holder 10. The guide member 42 is screwed onto an upper surface 38a of the lower lid 38.

The lower lid 38 is formed as a flat plate-shape member, which is slightly larger than the upper lid 36. In a state in which the lid body 28 of the accommodating member 26 is opened, a lower surface 38b side of the lower lid 38 faces toward the vehicle interior, so that the lower surface 38b is visible to the occupant. Therefore, the lower surface 38b of the lower lid 38 also is formed with a design surface that exhibits an aesthetically pleasing appearance.

Further, on both sides in the X-directions of the lower lid 38 corresponding to the mechanism housings 32, rotary extension pieces 44 are provided that extend downwardly in covering relation to the mechanism housings 32. The pair of rotary extension pieces 44 is pivotally supported through shaft members 46 for rotation toward side surfaces in the X-directions of the pair of mechanism housings 32. The lid body 28 is rotated (for example, by 90° or greater) until side thereof in the Y2 direction of the lower lid 38 comes into abutment against side surfaces in the Y2 direction of the mechanism housings 32, whereby accommodating spaces of the container holding sections 30 are exposed.

The aforementioned assembly structure 40 is disposed on the upper surface 38a of the lower lid 38 and on a lower surface 36b of the upper lid 36. The assembly structure 40 is constituted by four engagement mechanisms 48 arranged on a side of the lid body 28 in the Y1 direction, and three clasping mechanisms 50 arranged on the side of the lid body 28 in the Y2 direction. In a state in which a side in the Y2 direction of the upper lid 36 and a side in the Y2 direction of the lower lid 38 are hooked together by the clasping mechanisms 50, the assembly structure 40 integrates the upper lid 36 and the lower lid 38 by engaging (latching) the engagement mechanisms 48 on the side in the Y1 direction of the upper lid 36 and the side in the Y1 direction of the lower lid 38.

More specifically, the three clasping mechanisms 50 are juxtaposed along a side in the longitudinal direction (X-directions) on the side in the Y2 direction of the lid body 28. The respective clasping mechanisms 50 are constituted by hook parts 52 disposed on the upper surface 38a of the lower lid 38, and frame members 54 disposed at positions corresponding to the hook parts 52 on the lower surface 36b of the upper lid 36. The hook parts 52 extend upwardly from the upper surface 38a of the lower lid 38, and are bent inwardly (in the Y1 direction) at a predetermined height. The frame members 54 include insertion parts 54a into which the hook parts 52 are inserted and hooked over, and project a predetermined amount and are bent downwardly on an inner side from the inner surface of the peripheral edge 36c of the upper lid 36. More specifically, by insertion of the hook parts 52 into the insertion parts 54a of the frame members 54, the clasping mechanisms 50 realize a clasped condition on the side in the Y2 direction of the upper lid 36 and the lower lid 38.

The structure of the clasping mechanisms 50 is not particularly limited, and various configurations can be applied that enable engagement of the side in the Y2 direction of the upper lid 36 and the lower lid 38. For example, the hook parts 52 are not limited to being formed as inwardly bent projecting members, and may be configured as outwardly projecting members (projecting in the same projecting direction, i.e., the Y2 direction, as the later-described hook members 68) to thereby enable engagement between the frame members 54 and the hook parts 52.

Figure 3A:
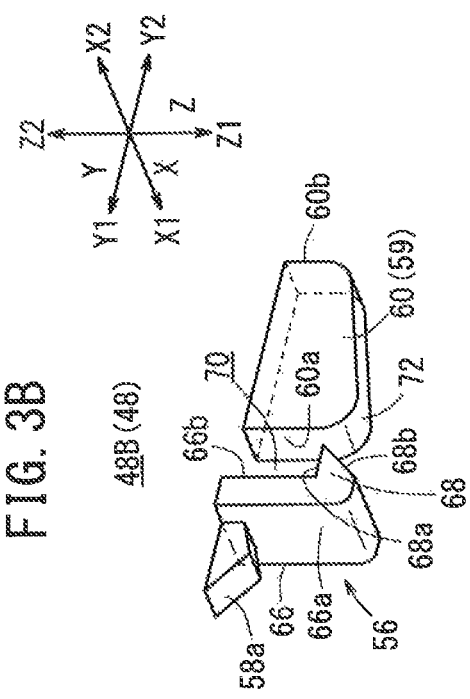
FIG. 3A is a perspective view of main components, showing a hook-shaped part and a projecting wall of a first engagement mechanism.
Figure 3B:
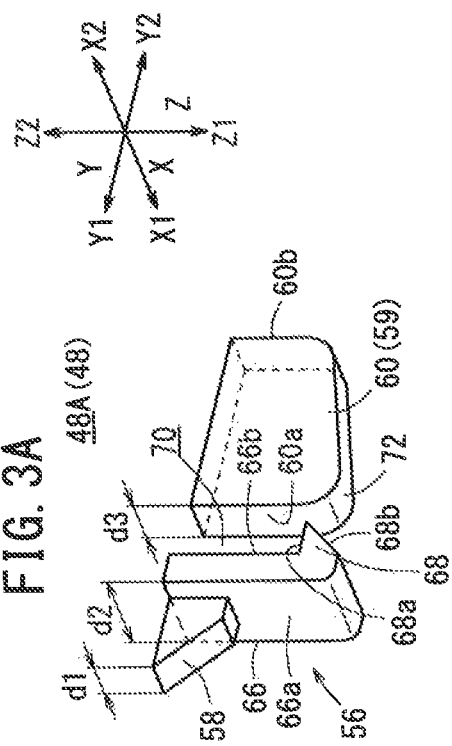
FIG. 3B is a perspective view of main components, showing a hook-shaped part and a projecting wall of a second engagement mechanism.
Figure 3C:
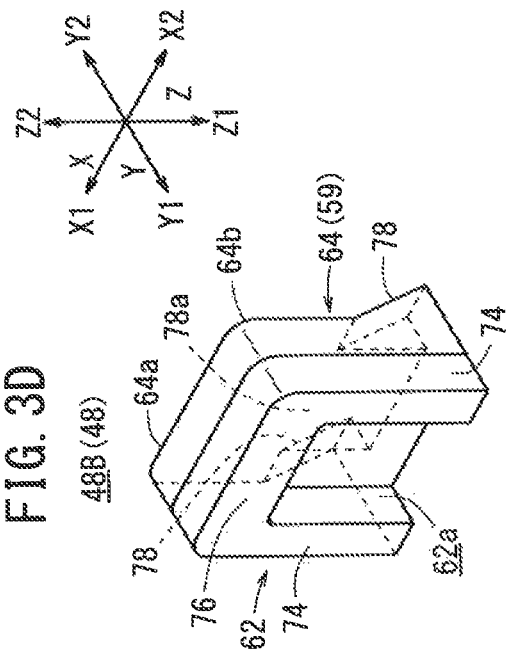
FIG. 3C is a perspective view of main components, showing an arch-shaped piece of the first engagement mechanism.
Figure 3D:
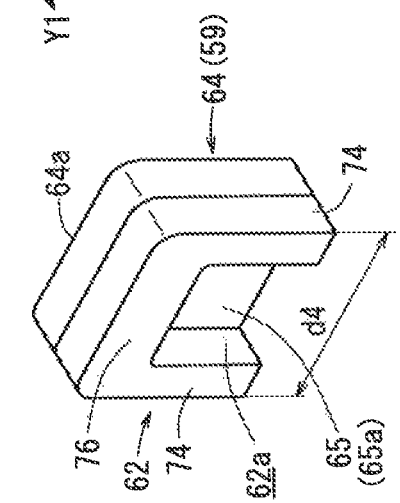
FIG. 3D is a perspective view of main components, showing an arch-shaped piece of the second engagement mechanism.

FIG. 3A is a perspective view of main components, showing a hook-shaped part 56 and a projecting wall 60 of a first engagement mechanism 48A. FIG. 3B is a perspective view of main components, showing a hook-shaped part 56 and a projecting wall 60 of a second engagement mechanism 48B. FIG. 3C is a perspective view of main components, showing an arch-shaped piece 62 of the first engagement mechanism 48A. FIG. 3D is a perspective view of main components, showing an arch-shaped piece 62 of the second engagement mechanism 48B.

As shown in FIG. 2 and FIGS. 3A through 3D, the four engagement mechanisms 48 are juxtaposed along a side in the longitudinal direction (X-directions), and are placed inwardly at positions separated by predetermined intervals from the side in the Y1 direction. Therefore, visibility of the engagement mechanisms 48 from between the upper lid 36 and the lower lid 38 is prevented.

Each of the respective engagement mechanisms 48 is constituted from a hook-shaped part 56 (engaging member) that projects from the lower surface 36b of the upper lid 36, a hook-shaped part rib 58 that reinforces the projection of the hook-shaped part 56, a projecting wall 60 (regulating member 59) disposed at a position facing the hook-shaped part 56, an arch-shaped piece 62 (engaged member) that projects from the upper surface 38a of the lower lid 38 at a position corresponding to the hook-shaped part 56, and a support wall 64 (regulating member 59) that reinforces the projection of the arch-shaped piece 62. Further, four juxtaposed engagement mechanisms 48 are formed by two members, which are disposed centrally in the X-directions, and two other members having slightly different shapes, which are disposed on opposite sides thereof (see FIG. 2). Hereinbelow, the engagement mechanisms 48 that are disposed centrally in the X-directions of the lid body 28 will be referred to as first engagement mechanisms 48A, whereas the engagement mechanisms 48 that are disposed on opposite sides thereof in the X-directions will be referred to as second engagement mechanisms 48B.

As shown in FIG. 3A, the hook-shaped part 56 of the first engagement mechanism 48A includes an extension 66 disposed continuously on the lower surface 36b of the upper lid 36, and a hook member 68 disposed continuously with a lower part of the extension 66. The extension 66 is formed in a flat plate shape having a predetermined plate thickness, and with a longitudinal direction thereof extending in the Z-directions. One surface of the plate (a side surface 66b in the Y2 direction) is disposed in facing relation to the projecting wall 60.

The hook member 68 projects toward the projecting wall 60 (in the Y2 direction) from a side surface 66b in the Y2 direction of the extension 66. The hook member 68 is formed with a triangular shape as viewed from the side, and includes a hooking surface 68a, which is disposed perpendicularly to the extension 66 along the X-directions, and an inclined surface 68b, which is inclined on a side opposite from the hooking surface 68a.

Further, the hook-shaped part rib 58 is formed with a trapezoidal shape, which is continuous with the other surface (a side surface 66a in the Y1 direction) of the plate of the extension 66 and the lower surface 36b of the upper lid 36. The hook-shaped part rib 58 supports the upper side of the extension 66, whereby inadvertent elastic deformation of the extension 66 is suppressed, and further includes a function to distribute stresses applied to the hook-shaped part 56. A width d1 in the X-directions of the hook-shaped part rib 58 is formed to be narrower than a width d2 in the X-directions of the extension 66, and the hook-shaped part rib 58 is disposed continuously in the center in the X-directions of the extension 66. Owing thereto, the extension 66 can be supported in a stable manner, and the hook-shaped part rib 58 can be formed with a small size, thereby reducing the size and weight of the lid body 28.

The projecting wall 60 that faces the hook-shaped part 56 is disposed at a position separated by a predetermined interval (gap 70) from a side surface 66b in the Y2 direction of the extension 66. The gap 70 is substantially the same or slightly narrower than the width in the Y-directions of the arch-shaped piece 62 and the support wall 64. The projecting wall 60 includes a function to sandwich the support wall 64 and the arch-shaped piece 62, which have been inserted into the gap 70, in cooperation with the hook-shaped part 56. Consequently, looseness or chattering of the arch-shaped piece 62 and the support wall 64 is prevented, and falling over of the arch-shaped piece 62 and the support wall 64 in the Y2 direction can be regulated.

The projecting wall 60 is formed in a trapezoidal shape, having a long Y1 direction side portion 60a located proximally to the hook-shaped part 56, and a short Y2 direction side portion 60b located distally from the hook-shaped part 56. The Y1 direction side portion 60a extends over a length in the Y-directions, so as to be capable of reliably preventing falling over of the arch-shaped piece 62 and the support wall 64. With the engagement mechanism 48 according to the present embodiment, although the projecting length of the Y1 direction side portion 60a of the projecting wall 60 is shorter than the projecting length of the hook-shaped part 56, the projecting lengths of the hook-shaped part 56 and the Y1 direction side portion 60a may be the same.

Further, a width d3 in the X-directions of the projecting wall 60 is narrower than the width d2 in the X-directions of the hook-shaped part 56. The projecting wall 60 is disposed continuously with the lower surface 36b of the upper lid 36, in facing relation to the Y1 direction side portion 60a, and centrally in the X-directions of the hook-shaped part 56. Therefore, although the projecting wall 60 abuts only against a central portion in the X-directions of the support wall 64, the Y1 direction side portion 60a thereof abuts over a wide area vertically with respect to the support wall 64, whereby the arch-shaped piece 62 and the support wall 64 can be firmly supported.

Furthermore, when the arch-shaped piece 62 is hooked by the hook-shaped part 56, a lower side corner of the Y1 direction side portion 60a of the projecting wall 60 is formed as a guide member 72 that guides the support wall 64 (or the arch-shaped piece 62). The guide member 72 has an arcuate shape, which guides the support wall 64, which is in abutment with the guide member 72, smoothly into a gap 70, whereupon engagement between the arch-shaped piece 62 and the hook-shaped part 56 can be promoted.

As shown in FIG. 3C, the arch-shaped piece 62 includes a pair of pillars 74 that project upwardly while being disposed continuously with the upper surface 38a of the lower lid 38, and a bridging part 76 that bridges over upper portions of the pillars 74. A width d4 of the arch-shaped piece 62, which is constituted by the pair of pillars 74, is wider than the width d2 in the X-directions of the hook-shaped part 56, and the pillars 74 are juxtaposed such that the bridging part 76 extends in the X-directions, and the hook member 68 is engaged with the bridging part 76. Further, the arrangement position in the X-directions of the projecting wall 60 with respect to the arch-shaped piece 62 is set within a range in the widthwise direction (X-directions) of the bridging part 76. The direction (Y-directions) in which the projecting wall 60 extends is perpendicular to that of the bridging part 76.

A hole 62a, which is constituted by the pair of pillars 74, the bridging part 76, and the upper surface 38a of the lower lid 38, is closed by the support wall 64 on a side in the Y2 direction of the arch-shaped piece 62, thereby providing a cutaway condition (recess) with the same thickness as that of the bridging part 76 in the Y1 direction. In this manner, due to the portion (closing wall 65) of the support wall 64 that closes the hole 62a, the strength of the support wall 64, and thus the strength of the arch-shaped piece 62, can be further increased. Alternatively, the support wall 64 may be formed in a gate-like shape corresponding to the shape of the arch-shaped piece 62, with the hole 62a penetrating therethrough.

The support wall 64 that reinforces the arch-shaped piece 62 is a plate-shaped member, which is secured tightly to a side in the Y2 direction of the arch-shaped piece 62. Mainly, the support wall 64 serves to increase the thickness in the Y-directions of the arch-shaped piece 62, such that when the arch-shaped piece 62 is inserted into the gap 70 between the hook-shaped part 56 and the projecting wall 60, the gap 70 is eliminated by abutment against the projecting wall 60 (hereinbelow, the portion that abuts with the projecting wall 60 is referred to as an "abutting portion 64a"). In addition, by extending to the upper surface 38a of the lower lid 38, the support wall 64 also includes a function to inhibit falling over of the arch-shaped piece 62. For the engagement mechanism 48 according to the present embodiment, a structure is used in which the arch-shaped piece 62 and the support wall 64 are each formed separately. However, the support wall 64 and the arch-shaped piece 62 may be formed together in an integral fashion. By being formed integrally, the strength of the arch-shaped piece 62 can be further increased.

On the other hand, as shown in FIG. 3B, the second engagement mechanism 48B is formed such that a projecting length in the Z1 direction of the hook-shaped part 56 and the projecting wall 60 is shorter than the projecting length of the hook-shaped part 56 and the projecting wall 60 of the first engagement mechanism 48A. In addition, as shown in FIG. 3D, the projecting length in the Z2 direction of the arch-shaped piece 62 and the support wall 64 of the second engagement mechanism 48B is formed to be longer than the projecting length of the arch-shaped piece 62 and the projecting wall 60 of the first engagement mechanism 48A.

Further, as shown in FIG. 3B, a hook-shaped part rib 58a of the second engagement mechanism 48B is formed narrowly within a range corresponding to the projecting length of the hook-shaped part 56, and is continuous with the side surface 66a in the Y1 direction of the extension 66. In this manner, even if the hook-shaped part rib 58a is formed to be shorter, since the hook-shaped part 56 is short, inadvertent elastic deformation of the hook-shaped part 56 can be suppressed. More specifically, the range within which the hook-shaped part ribs 58, 58a are disposed continuously with the extensions 66 preferably are set suitably at positions upwardly of the bridging parts 76, corresponding to the insertion position of the arch-shaped pieces 62 (bridging parts 76). With the hook-shaped part ribs 58, 58a being formed in this manner, interference with elastic deformation of the hook-shaped parts 56 is eliminated at the time of engagement between the hook-shaped parts 56 and the arch-shaped pieces 62.

Furthermore, as shown in FIG. 3D, support wall ribs 78 for reinforcing the projection of the support wall 64 is formed integrally on a side surface 64b in the Y2 direction of the support wall 64 of the second engagement mechanism 48B. By including the support wall ribs 78 in this manner, even if the extending length of the arch-shaped piece 62 and the support wall 64 is long, elastic deformation in the Y-directions of the support wall 64 can be suppressed more securely.

The support wall ribs 78 are disposed continuously as a pair on both ends in the X-directions of the support wall 64, with a space 78a being formed between the pair of support wall ribs 78. The projecting wall 60 is disposed so as to be positioned (in a space 78a) between the pair of support wall ribs 78. Therefore, in a state of engagement between the hook-shaped part 56 and the arch-shaped piece 62, the projecting wall 60 is inserted into the space 78a, and in cooperation with the hook-shaped part 56, grips the arch-shaped piece 62 and the support wall 64. Consequently, without the second engagement mechanism 48B being increased in size, the strength of the arch-shaped piece 62 can be enhanced, and an engaged state can firmly be achieved.

Figure 4A:
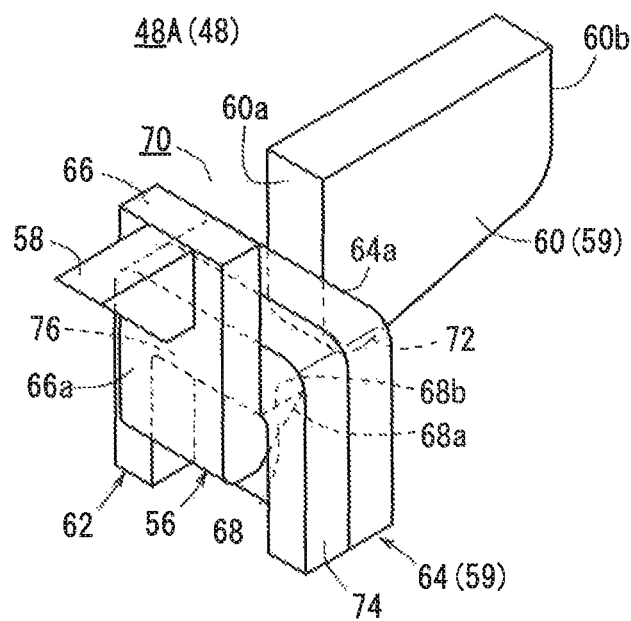
FIG. 4A is a perspective view showing an engaged state of the first engagement mechanism.
Figure 4A:
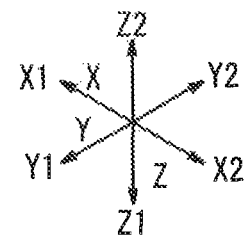

The cup holder 10 according to the present embodiment is constructed basically as described above. Next, operations and advantages of the cup holder 10 will be described. FIG. 4A is a perspective view showing an engaged state of the first engagement mechanism 48A, and FIG. 4B is a partial cross-sectional side view showing the engaged state of the first engagement mechanism 48A in FIG. 4A.

With the lid body 28 of the cup holder 10, as described above, an upper lid 36 and a lower lid 38 having different design surfaces are connected by the assembly structure 40, whereby the lid body 28 can be opened and closed integrally with respect to the accommodating member 26. Since the lid body 28 is not used in a state in which the upper lid 36 and the lower lid 38 are separated from each other, after the upper lid 36 and the lower lid 38 have been assembled once, it is desirable for both members to continue to be kept connected together strongly. For this reason, the engagement mechanism 48 (the first engagement mechanisms 48A and the second engagement mechanisms 48B), which essentially forms the engagement between the upper lid 36 and the lower lid 38, functions to firmly maintain the state of engagement therebetween. Moreover, in spite of the fact that the first engagement mechanisms 48A and the second engagement mechanisms 48B have different shapes, since the functions thereof are not changed significantly, the operations and advantageous effects of the first engagement mechanisms 48A will be described representatively in detail, while description of the second engagement mechanisms 48B is omitted.

In a condition in which the hook parts 52 of the clasping mechanisms 50 are hooked onto the frame members 54 (i.e., in a state of engagement on the side in the Y2 direction of the lid body 28), when the side in the Y1 direction of the upper lid 36 and the lower lid 38 of the lid body 28 are brought into mutual proximity, a structure is brought about in which the hook-shaped parts 56 and the arch-shaped pieces 62 are latched together (see also FIG. 2). Upon engagement between the hook-shaped part 56 and the arch-shaped piece 62, by the inclined surface 68b of the hook member 68 being placed in abutment against the bridging part 76, the hook-shaped part 56 flexes in the Y1 direction, and insertion of the arch-shaped piece 62 into the gap 70 is permitted. At this time, the support wall 64 is guided smoothly into the gap 70 by the guide member 72 of the projecting wall 60. Consequently, the first engagement mechanism 48A prevents the arch-shaped piece 62 and the support wall 64 from falling over in the Y2 direction (toward the side of the projecting wall 60), and only the hook-shaped part 56 is elastically deformed against the support of the hook-shaped part rib 58. Thus, when the bridging part 76 overcomes the hook member 68, the hook-shaped part 56 is elastically restored immediately, whereupon the hook member 68 is inserted into the hole 62a (recess) of the arch-shaped piece 62, and a lower surface of the bridging part 76 is latched by (engaged with) the hooking surface 68a of the hook member 68.

Figure 4B:
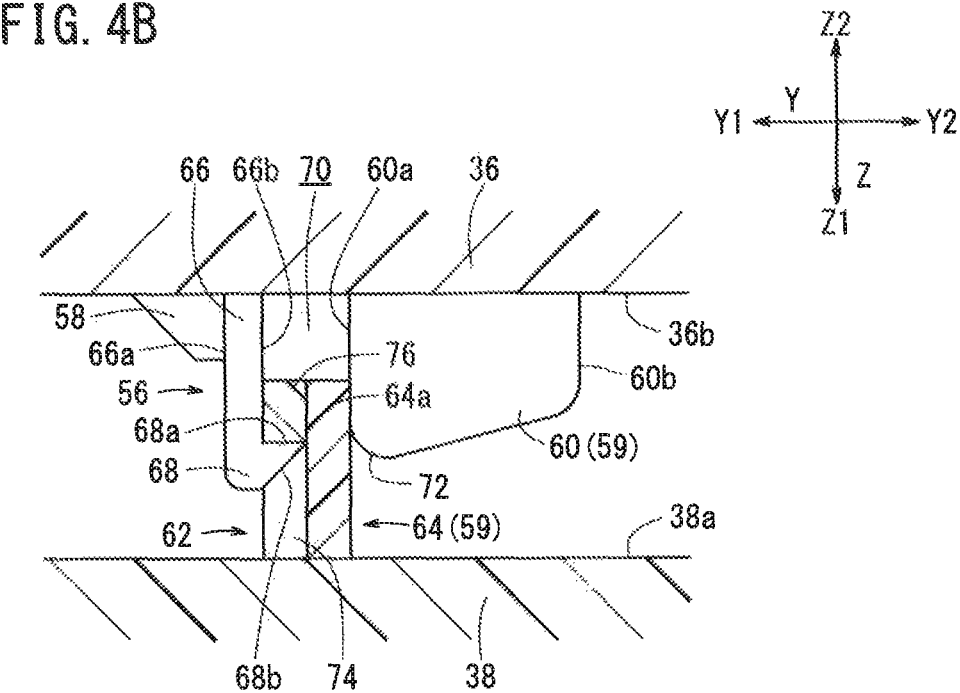
FIG. 4B is a partial cross-sectional side view showing the engaged state of the first engagement mechanism in FIG. 4A.
Figure 4B:
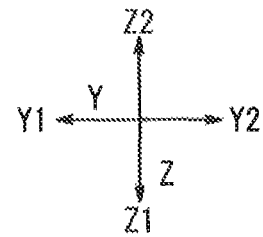

As shown in FIGS. 4A and 4B, in a state of engagement between the hook-shaped part 56 and the arch-shaped piece 62, the bridging part 76 and the support wall 64 (abutting portion 64a) are inserted directly into the gap 70. More specifically, the side in the Y1 direction of the bridging part 76 abuts against the side surface 66b in the Y2 direction of the extension 66, and the side in the Y2 direction of the support wall 64 abuts against the Y1 direction side portion 60a of the projecting wall 60. Consequently, in the first engagement mechanism 48A, the projecting wall 60 and the hook-shaped part 56 sandwich and grip the arch-shaped piece 62 and the support wall 64 therebetween, and a state of engagement without looseness or chattering is achieved.

In this case, when vibrations or shocks from the vehicle take place, or during opening and closing of the lid body 28, the lid body 28 of the cup holder 10 is subjected to forces tending to cause mutual slippage or shifting in the Y-directions between the upper lid 36 and the lower lid 38, and stresses in the Y-directions are applied to the hook-shaped parts 56 and the arch-shaped pieces 62. However, due to the above-described structure, the first engagement mechanisms 48A according to the present embodiment are capable of easily receiving such stresses.

More specifically, with the first engagement mechanisms 48A, in the event that stresses are applied in the Y2 direction, the stresses can be received by the projecting wall 60 that extends in the Y-directions, and falling over of the arch-shaped piece 62 and the support wall 64 in the Y2 direction can be prevented reliably. Conversely, in the case that stresses are applied in the Y1 direction, an action takes place to promote clasping of the hook-shaped part 56 and the arch-shaped piece 62, and falling over of the hook-shaped parts 56 in the Y1 direction can sufficiently be regulated at the hook-shaped part rib 58. Accordingly, the first engagement mechanism 48A can significantly enhance the engagement force between the hook-shaped part 56 and the arch-shaped piece 62, and integration of the upper lid 36 and the lower lid 38 can be realized appropriately.

The engagement mechanism 48 is not limited to the above-described structure, insofar as a structure (regulating member 59) is provided that is capable of effectively preventing falling over of the hook-shaped part 56 and the arch-shaped piece 62, and various alternative structures may be adopted. Below, several exemplary modifications of the engagement mechanism 48 will be described. In the following descriptions, structural features having the same structures or functions as those of the engagement mechanism 48 according to the present embodiment are designated using the same reference characters, and detailed description of such features is omitted.

Figure 5A:
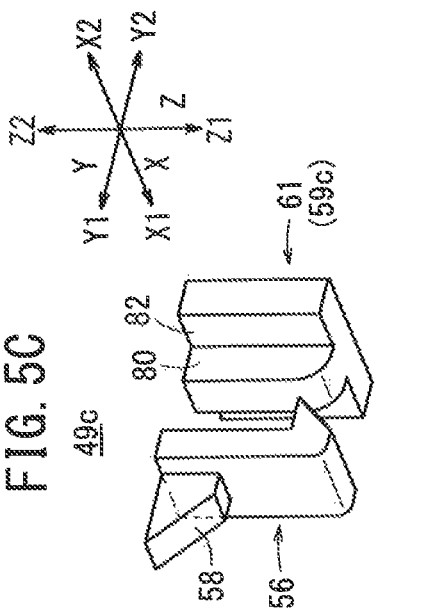
FIG. 5A is a partial cross-sectional side view showing an engagement mechanism according to a first modification.

An engagement mechanism 49a according to a first modification shown in FIG. 5A has a structure in which the support wall 64 is not disposed on the arch-shaped piece 62, and only the projecting wall 60 is provided as a regulating member 59a to prevent falling over in the Y2 direction of the arch-shaped piece 62. Even with such a structure, falling over of the arch-shaped piece 62 in the Y2 direction is regulated by the projecting wall 60, whereas falling over in the Y1 direction can be inhibited by the hook-shaped part 56 (hook-shaped part rib 58). Further, by making the gap 70 between the hook-shaped part 56 and the projecting wall 60 sufficiently narrow, the arch-shaped piece 62 can be sandwiched therebetween without looseness or rattling.

Figure 5B:
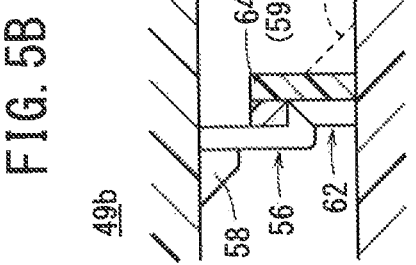
FIG. 5B is a partial cross-sectional side view showing an engagement mechanism according to a second modification.

An engagement mechanism 49b according to a second modification shown in FIG. 5B has a structure in which the projecting wall 60 is not disposed at a position facing the hook-shaped part 56, and only the support wall 64 is provided as a regulating member 59b to prevent falling over of the arch-shaped piece 62. Even with such a structure, the arch-shaped piece 62 can be reinforced by the support wall 64, and falling over of the arch-shaped piece 62 in the Y-directions can be inhibited. Support wall ribs 78 may also be disposed continuously with the support wall 64, serving as a structure to support the projection of the support wall 64.

Figure 5D:
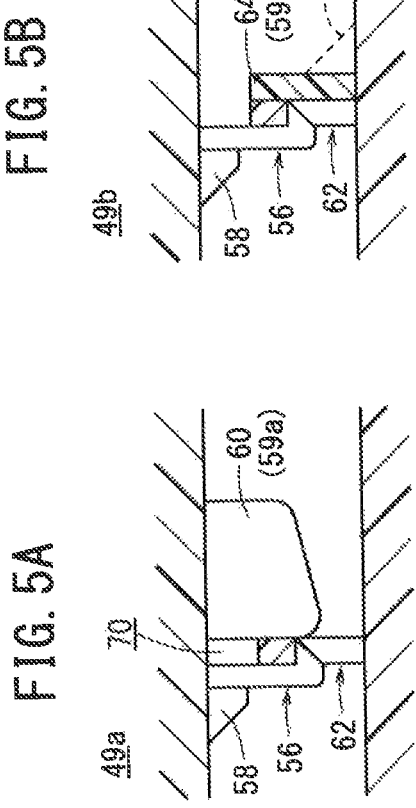
FIG. 5D is a partial perspective view of an engagement mechanism according to a fourth modification.
Figure 5C:
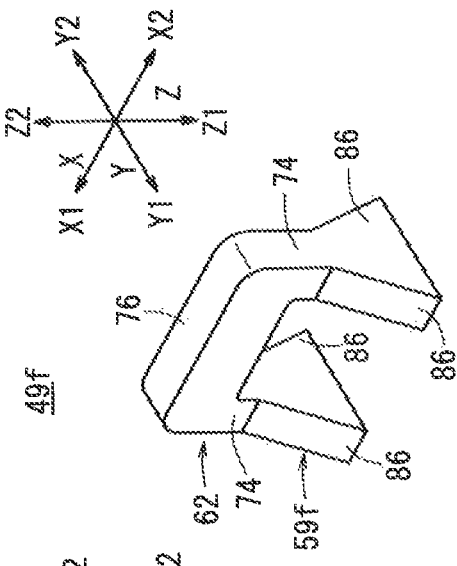
FIG. 5C is a partial perspective view of an engagement mechanism according to a third modification.

An engagement mechanism 49c according to a third modification shown in FIG. 5C has a structure in which a projecting wall 61 (regulating member 59c), which extends from the lower surface 36b of the upper lid 36 (see FIG. 2), is formed with a T-shape in a planar sectional view, and includes a projecting columnar portion 80, which projects in the Y1 direction, and an extension wall 82, which extends in the X-directions and supports the projecting columnar portion 80. The projecting columnar portion 80 abuts against the arch-shaped piece 62 or the support wall 64, in the same manner as the projecting wall 60, and the extension wall 82 supports the projecting columnar portion 80 by intersecting with the projecting columnar portion 80 in a perpendicular direction. Even if the projecting wall 61 is formed in such a shape, falling over of the arch-shaped piece 62 and the support wall 64 can be inhibited. In essence, the shape of the projecting wall 60 is not particularly limited, and the projecting wall 60 can assume a variety of configurations.

An engagement mechanism 49d according to a fourth modification shown in FIG. 5D has a structure in which a hook-shaped part rib 58b is disposed between the hook-shaped part 56 and the projecting wall 60 (regulating member 59d), and is connected to both members. More specifically, the hook-shaped part rib 58b is disposed continuously with the side surface 66b in the Y2 direction of the extension 66, extends toward the projecting wall 60, and is connected to the projecting wall 60. Consequently, the hook-shaped part rib 58b can inhibit elastic deformation in the Y-directions of the hook-shaped part 56, together with inhibiting falling over, etc., of the projecting wall 60 in the X-directions. Further, by inserting the arch-shaped piece 62 and the support wall 64 into a space that is surrounded by the hook-shaped part 56, the projecting wall 60, and the hook-shaped part rib 58b, an engagement without looseness or rattling is realized.

Figure 5E:
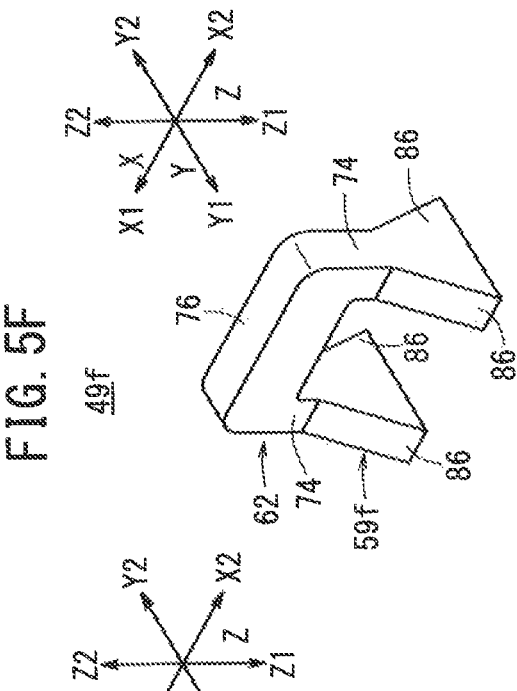
FIG. 5E is a partial perspective view of an engagement mechanism according to a fifth modification.

An engagement mechanism 49e (arch-shaped piece 62) according to a fifth modification shown in FIG. 5E has a structure in which an abutting portion 84 (regulating member 59e) is fixed tightly to a side in the Y2 direction of the bridging part 76, and in which the support wall 64 is not provided. In this manner, only with the abutting portion 84 disposed on the bridging part 76, since the thickness of the arch-shaped piece 62 in the Y-directions is increased, when the arch-shaped piece 62 is inserted into the gap 70 between the hook-shaped part 56 and the projecting wall 60, the gap 70 is eliminated by the abutting portion 84 abutting against the projecting wall 60, and looseness or rattling in the engaged state can be suppressed.

Figure 5F:
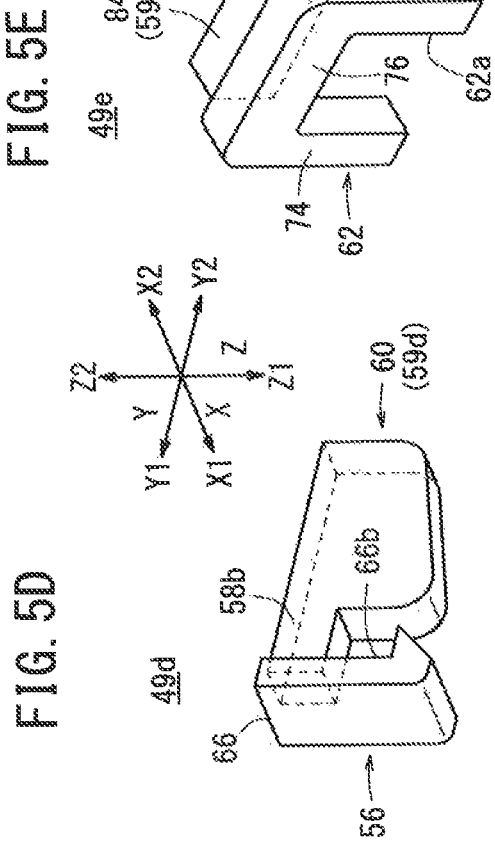
FIG. 5F is a partial perspective view of an engagement mechanism according to a sixth modification.

An engagement mechanism 49f according to a sixth modification shown in FIG. 5F has a structure in which, instead of the support wall 64, arch-shaped piece ribs 86 (regulating members 59f) are disposed continuously with the arch-shaped piece 62. The arch-shaped piece ribs 86 are disposed on a side surface in the Y1 direction and on a side surface in the Y2 direction of the arch-shaped piece 62, whereby the projection of the arch-shaped piece 62 overall is reinforced, and falling over of the arch-shaped piece 62 can be inhibited. Of course, the arch-shaped piece ribs 86 may be formed on only one of the side surface in the Y1 direction or the side surface in the Y2 direction. In essence, the regulating members that support the arch-shaped pieces 62 of the lower lid 38 are not particularly limited, and the regulating members can assume a variety of configurations.

Further, as another structure for the engagement mechanism, instead of the support wall 64, a closing wall 65a formed with a thin plate thickness for closing the side in the Y2 direction of the hole 62a of the arch-shaped piece 62 may be provided (refer also to FIG. 3C). Even if such a closing wall 65a is provided, the projection of the arch-shaped piece 62 can be reinforced, and the closing wall 65a can function as a regulating member. Further, by being connected to the pair of pillars 74 and the bridging part 76, the closing wall 65a is capable of enhancing the strength of the arch-shaped piece 62 (pillars 74).

As described above, in accordance with the cup holder 10 of the present embodiment, the projecting wall 60 or the support wall 64 are included as the regulating member 59 for preventing falling over of the arch-shaped piece 62, whereby the engaging force between the hook-shaped part 56 and the arch-shaped piece 62 can significantly be enhanced. More specifically, the projecting wall 60, which is disposed continuously with the upper lid 36, reliably regulates, i.e., prevents, falling over of the arch-shaped piece 62 in the Y2 direction, whereas the support wall 64 disposed on the lower lid 38 is capable of significantly enhancing the strength of the arch-shaped piece 62. When the upper lid 36 and the lower lid 38 of the lid body 28 are connected by the engagement mechanism 48 having a simple structure as described above, for example, even if external stresses are applied to the lid body 28, deformation of the hook-shaped parts 56 or the arch-shaped pieces 62, or loosening of the engagement sites thereof, can be inhibited. Consequently, loosening or chattering between the upper lid 36 and the lower lid 38 can be suppressed, and separation of the hook-shaped parts 56 and the arch-shaped pieces 62 (i.e., separation of the upper lid 36 and the lower lid 38) can suitably be inhibited.

In the engagement mechanism 48, the guide member 72 is included, which is capable of guiding the arch-shaped piece 62, such that when the hook-shaped part 56 is latched onto the arch-shaped piece 62 and the arch-shaped piece 62 comes into abutment against the guide member 72, the arch-shaped piece 62 is smoothly guided and the hook-shaped part 56 can be hooked over the arch-shaped piece 62. Further, by the projecting wall 60 extending a predetermined length in the Y-directions perpendicular to the widthwise direction of the hook-shaped part 56, even if the projecting wall 60 is formed with a small size, stresses applied to the projecting wall 60 from the arch-shaped piece 62 with which the hook-shaped part 56 is engaged can suitably be received. Further, if a structure is provided in which the width d3 in the X-directions of the projecting wall 60 is narrower than the width d2 in the X-directions of the hook-shaped part 56, the projecting wall 60 can be made smaller in size, and thus an increase in the size of the lid body 28 can be suppressed.

Further still, the regulating member 59 includes the support wall 64 (abutting portion 64a), which is gripped together with the arch-shaped piece 62 by a predetermined abutting force by the projecting wall 60 and the hook-shaped part 56. Thus, in a state of engagement between the arch-shaped piece 62 and the hook-shaped part 56, the gap 70 between the hook-shaped part 56 and the projecting wall 60 can be eliminated, and loosening or separation of the upper lid 36 and the lower lid 38 can further be suppressed. Further, the strength of the arch-shaped piece 62 can be enhanced significantly, and the engaged state between the arch-shaped piece 62 and the hook-shaped part 56 can be further strengthened and reinforced.

Although a preferred embodiment of the present invention has been described above, the present invention is not limited to this embodiment, and it goes without saying that various modifications can be adopted without deviating from the essence and gist of the present invention. For example, the engagement mechanism 48 may have a structure in which the hook-shaped part 56 and the projecting wall 60 are disposed on the lower lid 38, and the arch-shaped piece 62 and the support wall 64 are disposed on the upper lid 36. Further, for example, the arrangement position, order, and number, etc., of the first and second engagement mechanisms 48A, 48B disposed in the lid body 28 may be designed freely. Alternatively, only the first engagement mechanisms 48A (or the second engagement mechanisms 48B) may be provided as the engagement mechanisms 48.

The invention claimed is:

1. A cup holder having a lid body in which plural lid members are connected by an engagement mechanism, the lid body being capable of opening and closing, the engagement mechanism comprising:
    an engaging member that projects from one of the lid members from among the plural lid members;
    an engaged member that projects from another of the lid members from among the plural lid members, and which is engaged by the engaging member; and
    a regulating member disposed on either one of the plural lid members, which prevents falling over of the engaging member or the engaged member under a condition in which the engaging member and the engaged member are engaged.

2. The cup holder according to claim 1, wherein:
    the engaged member is an arch-shaped piece having a hole or a recess formed therein;
    the engaging member includes a hook-shaped part capable of being latched onto the arch-shaped piece; and
    the regulating member includes a projecting wall, which is disposed at a facing position separated a predetermined distance from the hook-shaped part, and in cooperation with the hook-shaped part grips the arch-shaped piece under a condition in which the arch-shaped piece and the hook-shaped part are engaged.

3. The cup holder according to claim 2, wherein the projecting wall includes a guide member, which is capable of guiding the arch-shaped piece between the projecting wall and the hook-shaped part.

4. The cup holder according to claim 2, wherein:
    the projecting wall extends a predetermined length in a direction perpendicular to a widthwise direction of the hook-shaped part; and
    a width of the projecting wall that faces the hook-shaped part is narrower than a width of the arch-shaped piece.

5. The cup holder according to claim 4, wherein the width of the projecting wall that faces the hook-shaped part is narrower than a width of the hook-shaped part.

6. The cup holder according to claim 2, wherein the regulating member is arranged together with an upper part of the arch-shaped piece between the hook-shaped part and the projecting wall under a condition in which the arch-shaped piece and the hook-shaped part are engaged, and includes an abutting portion, which is gripped together with the arch-shaped piece, by a predetermined abutting force, by the projecting wall and the hook-shaped part.

7. The cup holder according to claim 2, wherein:
    the regulating member includes a support wall, which is disposed together with the arch-shaped piece on the other lid member, and supports the arch-shaped piece in a projecting state;
    support wall reinforcing members configured to reinforce the projecting state of the support wall are disposed on both ends in a widthwise direction of the support wall; and
    the projecting wall is positioned between the support wall reinforcing members under a condition in which the arch-shaped piece and the hook-shaped part are engaged.

8. The cup holder according to claim 2, wherein:
    the arch-shaped piece includes a pair of pillars; and
    the pair of pillars is secured tightly or connected to a wall portion.

9. The cup holder according to claim 8, wherein the wall portion is a closing wall which is configured to close the hole of the arch-shaped piece.

10. The cup holder according to claim 2, wherein:
    the arch-shaped piece includes a pair of pillars and a bridging part (76) that bridges over upper portions of the pair of pillars; and
    the pair of pillars and the bridging part (76) are secured tightly or connected to a closing wall.

* * * * *